United States Patent Office 3,646,127
Patented Feb. 29, 1972

3,646,127
PROCESS FOR THE PREPARATION OF UNSATURATED CARBOXYLIC ACID
Shinichi Akiyama, Kamakura-shi, and Shoichiro Minami and Akinobu Toyoda, Yokohama-shi, Japan, assignors to The Japanese Geon Company, Ltd., Tokyo, Japan
No Drawing. Filed July 25, 1969, Ser. No. 845,052
Claims priority, application Japan, Aug. 1, 1968, 43/53,932
Int. Cl. C07c 57/04
U.S. Cl. 260—530 N    6 Claims

ABSTRACT OF THE DISCLOSURE

A process for the preparation of unsaturated carboxylic acids, which comprises catalytically reacting an unsaturated aldehyde with molecular oxygen at elevated temperatures in the vapor phase, in the presence of a catalyst comprising (a) molybdenum, (b) palladium or platinum, (c) silver, thorium, antimony, bismuth, chromium, selenium or tellurium, and (d) oxygen, as the essential components, and (e) phosphorus, boron, arsenic or silicon as an optional component.

---

This invention relates to vapor phase oxidation of unsaturated aldehydes to produce the corresponding unsaturated carboxylic acids.

Conventionally, as the catalysts useful in the preparation of unsaturated carboxylic acids from unsaturated aldehydes, molybdenum - cobalt - oxygen, molybdenum-arsenic-oxygen, phosphorus-molybdenum-oxygen (carried on silica), phosphorus-molybdenum-boron-oxygen, and molybdenum-tin-antimony-oxygen systems are known.

However, some of such known catalysts possess excessively high catalytic activity thereby rendering the control of reaction temperature difficult. Furthermore, decomposition reaction is induced, increasing the formation of undesirable side products such as carbon monoxide and dioxide and lowering the yield of the desired product (unsaturated carboxylic acid). In addition, some show too low catalytic activity to achieve satisfactory one pass conversion. Also some have unsatisfactory short catalyst life. Thus, these known catalysts bring negative effects on the commercial application of the reaction.

Accordingly, the object of the present invention is to provide a process for producing unsaturated carboxylic acids with high selectivity, at high conversion of starting unsaturated aldehydes under relatively low reaction temperatures, by the discovery of a novel catalyst system free from the foregoing defects.

It is now found that the above object is accomplished by catalytically reacting unsaturated aldehydes represented by the general formula, $CH_2=C(R) \cdot CHO$ (in which R stands for hydrogen or an alkyl radical having 1 to 4 carbon atoms), the typical examples thereof being acrolein and methacrolein, with molecular oxygen, at elevated temperatures and in the vapor phase, in the presence of a catalyst comprising (a) molybdenum, (b) palladium or platinum (c) silver, thorium, antimony, bismuth, chromium, selenium or tellurium, and (d) oxygen, as the essential components, and (e) phosphorus, boron arsenic or silicon as an optional component.

In the above-described catalysts employed in the subject process, the ratios of the elements can be optionally determined in accordance with the composition of material gas in the feed, operational conditions, type of desired product, etc. Generally, the atomic ratio of molybdenum to palladium or platinum is within the range of 2–50:1 particularly 3–25:1. Also the suitable atomic ratio of silver, thorium, antimony, bismuth, chromium, selenium, or tellurium to palladium or platinum is within the range of 0.1–10:1 and that of phosphorus, boron, arsenic or silicon to palladium or platinum is within the range of 0.2–10:1.

In the present invention, the method of catalyst preparation itself is not a very important factor, since it little affects the effect of the invention. Any conventional procedures of catalyst preparation such as mixing of respective metal oxides, evaporation of solution containing component elements to dryness, co-precipitation, etc. can be utilized to prepare a mixture of starting materials. The catalysts of this invention can be easily prepared by calcining such mixtures at 300°–500° C., in air, for several to several tens of hours. The starting materials need not be in the form of metal oxides, but the metals themselves or the compounds thereof can be used as long as they are finely convertible to the corresponding oxides by calcination. As such compounds of metals, salts of the metals such as nitrates, carbonates, ammonium salts, chlorides, etc., and acids of the metals such as molybdic, phosphomolybdic, silicomolybdic, arsenic, arsenious, phosphoric, boric, silicic, and chloroplatinic acids, etc. may be named. If silicon is selected as the optional component of the subject catalyst, it is preferred to use a silicon compound chemically bonded with other essential element, such as silicomolybdic acid, rather than silicic acid, as the silicon source.

The preparation of subject catalysts will be explained referring to two typical examples. In the first method, an aqueous nitric acid solution (or suspension) of the oxide of silver (or thorium, antimony, bismuth, chromium, selenium, or tellurium) is added to an aqueous solution of a molybdate, such as ammonium molybdate, followed by evaporation to dryness under stirring. The dried product is added to aqueous ammonia containing palladium chloride (or platinum chloride) and phosphoric acid (or boric, arsenic, or silicic acid), and again followed by evaporation to dryness under stirring. The resulting composition is calcined and ground to a suitable form, e.g. pellets or finely divided particles.

In the second method, an aqueous solution of phosphomolybdic acid is added to aqueous ammonia containing palladium chloride (or platinum chloride) and the oxide of silver (or of thorium, antimony, bismuth, chromium, selenium or tellurium), and also an oxide of phosphorus (or boron, arsenic, or silicon). Subsequently, the system is evaporated to dryness under stirring, calcined, and ground to provide a similar catalyst.

The obtained catalysts of this invention are complex catalytic oxides, consisting either of (a), (b), (c) and (d), or of (a), (b), (c), (d), and (e). However the precise composition thereof has not yet been confirmed. Thus it has not been confirmed if they are simple mixtures of plural metal oxides, or wherein the named elements are mutually linked directly or indirectly through oxygen.

The catalysts can if desired, be deposited upon supports such as silicon carbide, colloidal silica, alumina, refractory materials and like materials. The amount of the support can be suitably determined for individual cases, since it has no essential significance on the catalyst's activity.

In the present invention the molecular oxygen can of course be used in the pure form, but it may be diluted with an inert gas having no detrimental effect on the reaction, such as nitrogen, argon, carbon dioxide, saturated hydrocarbon gas, etc. Preferably, air is the most practical source of molecular oxygen.

The reaction temperature for practicing the subject process is variable over a wide range, depending on the correlation of plural factors such as composition of the catalyst employed, type of unsaturated aldehyde to be oxidized, ratio of unsaturated aldehyde to oxygen, supply rate of material gas, and contact time, etc. A generally preferred temperature ranges between 250°–400° C. Also the mol ratio of oxygen to unsaturated aldehyde in the feed gas supplied to the reactor suitably ranges between 0.2–5:1 while it may exceed 5.1. The suitable space velocity (SV) ranges between 200–3,000 hr.$^{-1}$, particularly 300–2,000 hr.$^{-1}$, as calculated from the apparent volume of the catalyst.

In the subject process the pressure condition is not a very important factor for the operation. The process is operable under high pressures, while quite satisfactory results can be obtained by the reaction under atmospheric or slightly elevated pressure.

In practicing the subject process, no essential difference is observed due to varied grain size of the catalyst. Thus, any apparatus suitable for practicing vapor phase oxidation can be generally used. The catalyst bed may be of fixed type which uses a shaped catalyst, or of the so-called fluidized type.

The unsaturated carboxylic acid can be recovered from the reaction product by conventional methods such as condensation, extraction with water or other suitable solvent. For example, a condenser may be used to condense and liquefy the unsaturated carboxylic acid, or the product may be separated and recovered with a solvent.

Since the oxidation reaction of the unsaturated aldehyde is greatly exothermic, the control of reaction temperature is difficult. Consequently, it is also difficult to selectively perform the object reaction. As a means to overcome this difficulty, steam is heretofore occasionally used as the diluent in the reaction, because it has a great heat capacity. However, since the catalyst of the invention exhibits high activity at low temperatures and maintains high selectivity of the reaction to facilitate the reaction temperature control, steam need not be used. Thus the object product can be obtained at high concentrations. This is a great advantage to the subsequent industrial refining and recovery step of the object product (unsaturated carboxylic acid). This feature can be considered as one of the favorable characteristics of the invention. Obviously, addition of steam is permissible, if such is desirable in view of the composition of material gas in the feed, operational conditions, type of desired product, catalyst composition, etc., employed in specific case.

Hereinafter the invention will be explained more concretely, with reference to working examples, in which the following definitions apply to the conversion of unsaturated aldehyde, and yield and selectivity of unsaturated carboxylic acid. All the analyses were conducted by means of gas chromatography.

Conversion (percent)

$$= \frac{\text{Unsaturated aldehyde in the feed (mol)} - \text{Unsaturated aldehyde in the effluent (mol)}}{\text{Unsaturated aldehyde in the feed (mol)}} \times 100$$

Yield (percent)

$$= \frac{\text{Unsaturated carboxylic acid formed (mol)}}{\text{Unsaturated aldehyde supply (mol)}} \times 100$$

$$\text{Selectivity (percent)} = \frac{\text{Yield}}{\text{Conversion}} \times 100$$

EXAMPLE 1

106 grams (0.086 mol) of ammonium molybdate $$(NH_4)_6Mo_7O_{24} \cdot 4H_2O$$

was dissolved in 200 ml. of water by heating, and 7.3 g. (0.025 mol) of antimony trioxide dissolved (or suspended) in 200 ml. of 30% nitric acid were added, thereto followed by evaporation to dryness under stirring. Then the resulting composition was added to 200 ml. of 10% aqueous ammonia containing 8.9 g. (0.05 mol) of palladium chloride and 5.0 g. (0.05 mol) of ortho-phosphoric acid dissolved therein, followed by evaporation to dryness under stirring. The remaining solid was calcined at 350° C. for 20 hours in air, in a muffle furnace to provide a catalyst.

In the same manner as above, catalysts were prepared in which the antimony trioxide was replaced in each run by the oxide of silver, thorium, bismuth, chromium, selenium, and tellurium, an oxide mixture of antimony and bismuth (Sb/Bi being 1/1 in atomic ratio), and an oxide mixture of tellurium and selenium (Te/Se being 1/1 in atomic ratio), each of the replacement components being in such an amount as to provide 0.05 gram atom of the element. When the component was a mixture of oxides, their amounts were so determined to provide 0.05 gram atom of the elements as the sum. The atomic ratio of the elements in the resulting catalyst compositions was as follows:

Mo:Pd:P:X≑12:1:1:1

(in which X stands for Sb, Ag, Th, Bi, Cr, Se, Te, Sb+Bi, or Te+Se).

8 ml. of the obtained catalysts were used in each run. The catalyst was placed in a glass reactor of 14 mm. inner diameter, and through which a material gas composed of 5% of methacrolein, 13% of oxygen, and 82% of nitrogen, the percentages being by volume, was passed at a space velocity (SV) of 600 hr.$^{-1}$ and temperature of 350° C. for approximately 3 hours. Thereafter at the various temperatures as specified in the table below, the reaction was conducted for 10 minutes each, with the results as given in the same table.

| Catalyst composition Mo-Pd-P-X | Reaction temperature, °C. | Methacrolein conversion (percent) | Methacrylic acid Yield (percent) | Methacrylic acid Selectivity (percent) |
|---|---|---|---|---|
| Ag | 345 | 76.8 | 41.3 | 53.8 |
| Th | 330 | 65.0 | 37.1 | 57.0 |
| Sb | 342 | 68.6 | 52.7 | 76.8 |
| Bi | 328 | 66.4 | 45.2 | 68.1 |
| Cr | 313 | 71.7 | 35.7 | 49.9 |
| Se | 360 | 73.4 | 40.5 | 55.2 |
| Te | 337 | 70.5 | 50.1 | 71.0 |
| Sb+Bi | 347 | 62.4 | 45.0 | 72.1 |
| Te+Se | 355 | 68.2 | 44.5 | 65.2 |

EXAMPLE 2

A catalyst was prepared substantially similar to that of Example 1, except that the amount of palladium chloride was increased to 17.8 g. (0.1 mol). The atomic ratio in the catalyst composition was as follows:

Mo:Pd:P:Sb≑12:2:1:1

The catalyst was used for oxidation of methacrolein under substantially the same conditions as employed in Example 1. Thus, at the reaction temperature of 338° C. the following results are obtained: methacrolein conversion of 70.3%, methacrylic acid yield of 51.0%, and selectivity of 72.6%.

EXAMPLE 3

By the substantially same method as employed in Example 1 except that the amount of antimony trioxide was reduced to 3.8 g. (0.013 mol), a catalyst of the following composition was prepared:

Mo:Pd:P:Sb≑12:1:1:0.5 in atomic ratio. This catalyst was used for oxidation of methacrolein under substantially same reaction conditions as employed in Example 1. At the reaction temperature of 344° C., the following results are obtained: methacrolein conversion of 68.4%, methacrylic acid yield of 48.0%, and the selectivity of 70.2%.

EXAMPLE 4

By the method substantially similar to that of Example 1 except that the ortho-phosphoric acid was replaced by 3.1 g. (0.05 mol) of boric acid or 7.6 g. (0.05 mol) arsenic acid, catalysts containing boron or arsenic were prepared. Separately, another catalyst containing silicon was prepared in the same manner, except that the ammonium molybdate was replaced by 114 g. (0.05 mol) arsenic acid, catalysts containing boron or arsenic and use of ortho-phosphoric acid was omitted. These catalysts (Mo:Pd:X:Sb=12:1:1:1, in atomic ratio, X standing for B, As, or Si) were used for oxidation of methacrolein under the same reaction conditions as employed in Example 1, with the following results.

| Catalyst composition Mo-Pd-X=Sb | Reaction temperature, °C. | Methacrolein conversion (percent) | Methacrylic acid | |
|---|---|---|---|---|
| | | | Yield (percent) | Selectivity (percent) |
| B | 347 | 67.4 | 45.3 | 67.3 |
| As | 357 | 63.4 | 39.5 | 62.4 |
| Si | 325 | 66.2 | 42.5 | 64.1 |

EXAMPLE 5

By the method substantially similar to that of Example 1 except that the palladium chloride was replaced by 25.9 g. (0.05 mol) of chloroplatinic acid, a catalyst of the following composition was prepared:

Mo:Pt:P:Sb≑12:1:1:1 in atomic ratio.

This catalyst was used for oxidation of methacrolein under substantially same reaction conditions as employed in Example 1. At the reaction temperature of 375° C., the following results are obtained: methacrolein conversion of 68.4%, methacrylic acid yield of 39.3%, and the selectivity of 59.5%.

EXAMPLE 6

A Mo-Pd-Sb catalyst was prepared by substantially same method as employed in Example 1, except that the amount of antimony trioxide was increased to 10.2 g. (0.035 mol), and use of ortho-phosphoric acid was omitted.

Similarly, catalysts were prepared by replacing antimony trioxide in each run by oxide of bismuth, tellurium, silver, and selenium, in an amount to provide 0.07 gram atom of each element.

The obtained catalysts had the composition as follows: Mo:Pd:X≑12:1:1.4 in atomic ratio, X standing for Sb, Bi, Te, Ag or Se.

Those catalysts were used for oxidation of methacrolein under substantially identical reaction conditions as employed in Example 1, with the results given in the table below.

| Catalyst composition Mo-Pd-X | Reaction temperature, °C. | Methacrolein conversion (percent) | Methacrylic acid | |
|---|---|---|---|---|
| | | | Yield (percent) | Selectivity (percent) |
| Sb | 337 | 63.2 | 38.2 | 60.5 |
| Bi | 351 | 59.0 | 30.8 | 52.1 |
| Te | 365 | 63.0 | 33.7 | 53.5 |
| Ag | 360 | 67.3 | 34.3 | 51.0 |
| Se | 356 | 62.4 | 31.4 | 50.4 |

EXAMPLE 7

A Mo-Pd-P-Sb catalyst (Mo:Pd:P:Sb≑12:1:2:1 in atomic ratio) was prepared in substantially same manner to Example 1, except that the amount of ortho-phosphoric acid used was 10.0 g. (0.1 mol).

This catalyst was used for oxidation of acrolein under substantially the same reaction conditions as employed in Example 1. At the reaction temperature of 325° C., the following results are obtained: acrolein conversion of 65.0%, acrylic acid yield of 42.3%, and the selectivity of 65.1%.

EXAMPLE 8

106 grams (0.086 mol) of ammonium molybdate were dissolved in 200 ml. of water by heating, and 7.3 g. (0.025 mol) of antimony trioxide dissolved (or suspended) in 200 ml. of 30% nitric acid were added thereto, followed by evaporation to dryness under stirring. The obtained composition and 470 g. of Alundum (⅛″ x ⅛″) were added to 200 ml. of 10% aqueous ammonia containing 8.9 g. (0.05 mol) of palladium chloride and 5.0 g. (0.05 mol) of ortho-phosphoric acid, again followed by evaporation to dryness under stirring. Thereafter the catalyst deposited on a support (Alundum) was calcined in air at 350° C. for 20 hours, in a muffle furnace.

The resulting catalyst had a composition of

Mo:Pd:P:Sb≑12:1:1:1 in atomic ratio. The amount of catalyst deposited on an Alundum was approximately 13.5%, as calculated from the weight increase.

One-hundred (100) ml. (115 g.) of the obtained catalyst were placed in a SUS 27 stainless steel reactor tube of 25 mm. in inner diameter, and through which a material gas composed of 7.4% of methacrolein and 92.6% of air, the percentages being by volume, was passed for approximately 3 hours, at a space velocity (SV) of 500 hr.⁻¹, and reaction temperature of 350° C. Thereafter the reaction was performed at the various temperatures as indicated in table below for 10 minutes each, with the results as given in the same table.

| Reaction temperature, °C. | Methacrolein conversion (percent) | Methacrylic acid | |
|---|---|---|---|
| | | Yield (percent) | Selectivity (percent) |
| 330 | 46.5 | 37.8 | 81.3 |
| 342 | 58.4 | 45.2 | 77.4 |
| 355 | 71.5 | 51.3 | 71.8 |
| 363 | 73.9 | 49.7 | 67.3 |
| 371 | 76.0 | 41.4 | 54.5 |

We claim:

1. A process for the preparation of an unsaturated carboxylic acid selected from the group consisting of acrylic acid and methacrylic acid, which comprises catalytically reacting an unsaturated aldehyde selected from the group consisting of acrolein and methacrolein with molecular oxygen at elevated temperatures in the vapor phase, in the presence of a catalyst consisting essentially of (a) molybdenum, (b) palladium or platinum, (c) a member selected from silver, thorium, antimony, bismuth, chromium, selenium, tellurium and mixtures thereof, and (d) oxygen, the atomic ratio of (a):(b):(c) being 3–25:1:0.1–10.

2. A process for the preparation of an unsaturated carboxylic acid selected from the group consisting of acrylic acid and methacrylic acid, which comprises catalytically reacting an unsaturated aldehyde selected from the group consisting of acrolein and methacrolein with molecular oxygen at elevated temperatures in the vapor phase in the presence of catalyst consisting essentially of (a) molybdenum, (b) palladium or platinum, (c) a member selected from silver, thorium, antimony, bismuth, chromium, selenium, tellurium and mixtures thereof, (d) oxygen, and (e) phosphorus, boron, arsenic or silicon, the atomic ratio of (a):(b):(c) being 3–25:1:0.1–10 and that of (e):(b) being 0.2–10:1.

3. A process for the preparation of an unsaturated carboxylic acid selected from the group consisting of acrylic acid and methacrylic acid, which comprises catalytically reacting an unsaturated aldehyde selected from the group consisting of acrolein and methacrolein with molecular oxygen at a mol ratio of oxygen to unsaturated aldehyde within the range of 0.2–5.0:1, at a temperature within the range of 250°–400° C., and at a space velocity of 200–3,000 hr.⁻¹, in the vapor phase, in the presence of a catalyst consisting essentially of (a) molybdenum, (b) palladium or platinum, (c) a member selected from silver, thorium, antimony, bismuth, chromium, selenium, tellurium and mixtures thereof, and (d) oxygen, the atomic ratio of (a):(b):(c) being 3–25:1:0.1–10.

4. A process for the preparation of an unsaturated carboxylic acid selected from the group consisting of acrylic acid and methacrylic acid, which comprises catalytically reacting an unsaturated aldehyde selected from the group consisting of acrolein and methacrolein with molecular oxygen at a mol ratio of oxygen to unsaturated aldehyde within the range of 0.2–5.0, at a temperature within the range of 250°–400° C., and at a space velocity of 200–3,000 hr.$^{-1}$, in the vapor phase, in the presence of a catalyst consisting essentially of (a) molybdenum, (b) palladium or platinum, (c) a member selected from silver, thorium, antimony, bismuth, chromium, selenium, tellurium and mixtures thereof, (d) oxygen, and (e) phosphorus, boron, arsenic or silicon, the atomic ratio of (a):(b):(c) being 3–25:1:0.1–10, and that of (e):(b) being 0.2–10:1.

5. The process of claim 1, wherein said catalyst is supported on a carrier.

6. The process of claim 2, wherein said catalyst is supported on a carrier.

References Cited
FOREIGN PATENTS

| | | | |
|---|---|---|---|
| 10,604 | 4/1968 | Japan | 260—533 N |
| 904,304 | 8/1962 | United Kingdom | 260—533 N |
| 939,713 | 10/1963 | United Kingdom | 260—533 N |

LORRAINE A. WEINBERGER, Primary Examiner

R. D. KELLY, Assistant Examiner

U.S. Cl. X.R.

252—432, 435, 458, 470